(12) United States Patent
Mukadam et al.

(10) Patent No.: US 12,246,271 B2
(45) Date of Patent: Mar. 11, 2025

(54) MEDIA RETENTION PLATE FOR A BLOCK UNDERDRAIN SYSTEM

(71) Applicant: De Nora Water Technologies, LLC, Colmar, PA (US)

(72) Inventors: Rehan A Mukadam, Albuquerque, NM (US); Roy Yancey, Albuquerque, NM (US); Steve Jantsch, Beaver Falls, PA (US); Kevin Schwarz, Albuquerque, NM (US); Stan Shmia, Philadephia, PA (US)

(73) Assignee: De Nora Water Technologies, LLC, Colmar, PA (US)

( * ) Notice: Subject to any disclaimer, the term of this patent is extended or adjusted under 35 U.S.C. 154(b) by 0 days.

(21) Appl. No.: 18/626,036

(22) Filed: Apr. 3, 2024

(65) Prior Publication Data
US 2024/0335770 A1    Oct. 10, 2024

Related U.S. Application Data

(60) Provisional application No. 63/494,138, filed on Apr. 4, 2023.

(51) Int. Cl.
  *B01D 24/46*    (2006.01)
  *B01D 24/00*    (2006.01)
  *B01D 24/24*    (2006.01)

(52) U.S. Cl.
  CPC ....... *B01D 24/4631* (2013.01); *B01D 24/001* (2013.01); *B01D 24/24* (2013.01); *B01D 2101/04* (2013.01); *B01D 2201/087* (2013.01)

(58) Field of Classification Search
None
See application file for complete search history.

(56) References Cited

U.S. PATENT DOCUMENTS

| | | | | | |
|---|---|---|---|---|---|
| 341,649 | A | * | 5/1886 | Gilman | B01D 24/24 210/255 |
| 527,819 | A | * | 10/1894 | Strunz | B01D 24/14 210/283 |
| 538,720 | A | * | 5/1895 | Allen | B01D 24/005 210/275 |
| 624,893 | A | * | 5/1899 | Davis | B01D 24/24 210/293 |
| 662,211 | A | * | 11/1900 | Wiedersheim | C02F 3/06 210/151 |

(Continued)

*Primary Examiner* — Robert J Popovics
(74) *Attorney, Agent, or Firm* — D'Ambrosio & Menon, PLLC; Usha Menon

(57) ABSTRACT

A media retention plate for an underdrain system having one or more filter blocks. The plate can include a first slot configured to allow the passage of air and a second slot configured to allow the passage of water during an air backwash. The media retention plate is configured to facilitate the water to flow back into the one or more filter blocks through the second slot while maintaining air flow through the first slot to create an optimal collapse pulse. The first and second slots are evenly sized and evenly spaced apart to facilitate the creation of a relatively smaller-sized collapse pulse during a sequential air-water backwash. A plurality of inserts can be arranged along a perimeter of a basal portion of the bottom surface of the media retention plate. The inserts improve the structural integrity of and prevent uplift of the media retention plate.

10 Claims, 6 Drawing Sheets

(56) References Cited

U.S. PATENT DOCUMENTS

| | | | | | |
|---|---|---|---|---|---|
| 667,005 A * | 1/1901 | Davis | B01D 24/008<br>100/297 |
| 730,518 A * | 6/1903 | Davis | B01D 24/24<br>210/293 |
| 801,810 A * | 10/1905 | Parmelee | B01D 24/24<br>210/279 |
| 865,993 A * | 9/1907 | Brossman | B01D 24/24<br>210/293 |
| 897,745 A * | 9/1908 | Jager | B01D 24/24<br>210/292 |
| 931,032 A * | 8/1909 | Busman | E02B 3/023<br>210/170.1 |
| 980,442 A * | 1/1911 | Schlafly | E03F 1/003<br>138/159 |
| 1,141,959 A * | 6/1915 | Herzbruch | C02F 1/003<br>210/293 |
| 1,142,270 A * | 6/1915 | Reisert | B01D 24/24<br>210/275 |
| 1,151,313 A * | 8/1915 | Wheeler | B01D 24/26<br>210/275 |
| 1,163,334 A * | 12/1915 | Gammage | B01D 24/22<br>210/275 |
| 1,189,521 A * | 7/1916 | Allen | B01D 24/24<br>210/291 |
| 1,277,832 A * | 9/1918 | Beckley | B01D 35/043<br>210/455 |
| 1,358,840 A * | 11/1920 | Gammage | B01D 24/4631<br>210/293 |
| 1,457,514 A * | 6/1923 | Flower | B01D 24/4631<br>210/293 |
| 1,465,968 A * | 8/1923 | Caps | B01D 24/005<br>210/293 |
| 1,544,617 A * | 7/1925 | Wagner | B01D 24/4636<br>210/293 |
| 1,572,398 A * | 2/1926 | Leopold | B01D 24/4631<br>210/275 |
| 1,584,142 A * | 5/1926 | Rawn | C02F 3/10<br>261/95 |
| 1,601,465 A * | 9/1926 | Barbour | C02F 3/10<br>210/293 |
| 1,687,782 A * | 10/1928 | Norton | C02F 3/10<br>210/293 |
| 1,698,079 A * | 1/1929 | Wagner | B01D 24/4631<br>210/275 |
| 1,770,830 A * | 7/1930 | Barbour | B01D 24/24<br>210/293 |
| 1,773,417 A * | 8/1930 | Whitacre | C02F 3/10<br>210/293 |
| 1,780,791 A * | 11/1930 | Lenderink | B01D 24/22<br>210/293 |
| 1,788,383 A * | 1/1931 | Delery | B01D 24/24<br>210/293 |
| 1,883,468 A * | 10/1932 | Barbour | C02F 3/10<br>210/293 |
| 1,892,842 A * | 1/1933 | Kimberling | E02B 11/005<br>210/293 |
| 2,046,298 A * | 6/1936 | Woods | B01D 24/24<br>210/293 |
| 2,075,300 A * | 3/1937 | Pflanz | B01D 24/007<br>210/280 |
| 2,084,351 A * | 6/1937 | Luce | B01D 24/24<br>210/293 |
| 2,154,167 A * | 4/1939 | Jenks | B01D 24/24<br>210/275 |
| 2,161,999 A * | 6/1939 | Christie | B01D 24/24<br>405/36 |
| 2,302,450 A * | 11/1942 | Laughlin | B01D 24/005<br>210/275 |
| 2,378,239 A * | 6/1945 | Myron | B01D 24/14<br>210/293 |
| 2,387,101 A * | 10/1945 | Walker | C02F 3/10<br>405/36 |
| 2,401,121 A * | 5/1946 | Thoresen | B01D 24/24<br>249/176 |
| 2,499,325 A * | 2/1950 | Miller | B01D 24/24<br>52/192 |
| 2,528,062 A * | 10/1950 | Lances | C02F 1/42<br>210/488 |
| 2,648,439 A * | 8/1953 | Miller, Jr. | B01D 24/22<br>210/292 |
| 2,679,319 A * | 5/1954 | Walker | B01D 24/005<br>210/275 |
| 2,710,692 A * | 6/1955 | Kegel | B01D 24/24<br>210/292 |
| 2,716,490 A * | 8/1955 | Barstow | B01D 24/14<br>210/293 |
| 2,745,553 A * | 5/1956 | Riddick | B01D 24/4631<br>210/292 |
| 2,802,339 A * | 8/1957 | Fogerty | C02F 3/046<br>405/47 |
| 2,818,977 A * | 1/1958 | Crist | B01D 24/24<br>210/291 |
| 2,874,844 A * | 2/1959 | Wanner | B01D 24/24<br>210/150 |
| 2,888,140 A * | 5/1959 | Hebert | B01D 24/4631<br>210/275 |
| 2,900,083 A * | 8/1959 | Oliver | B01D 24/24<br>210/293 |
| 2,929,505 A * | 3/1960 | Wanner | B01D 24/14<br>210/293 |
| 3,017,033 A * | 1/1962 | Schreiber | C02F 3/10<br>210/293 |
| 3,080,062 A * | 3/1963 | Herbert | B01D 24/24<br>210/275 |
| 3,110,667 A * | 11/1963 | Stuppy | B01D 24/14<br>210/275 |
| 3,247,971 A * | 4/1966 | Kastler | B01D 24/14<br>210/291 |
| 3,456,804 A * | 7/1969 | McGivern | B01D 24/4626<br>210/292 |
| 3,468,422 A * | 9/1969 | Camp | B01D 24/12<br>210/293 |
| 3,512,649 A * | 5/1970 | Nebolsine | B01D 24/24<br>210/279 |
| 3,615,019 A * | 10/1971 | Early | B01D 24/24<br>210/293 |
| 3,762,559 A * | 10/1973 | Knoy | B01D 24/12<br>210/293 |
| 3,840,117 A * | 10/1974 | Ross | B01D 24/4631<br>210/293 |
| 3,956,134 A * | 5/1976 | Sturgill | B01D 24/24<br>210/275 |
| 4,064,050 A * | 12/1977 | Heaney | B01D 24/4631<br>210/293 |
| 4,065,391 A * | 12/1977 | Farabaugh | B01D 24/24<br>210/293 |
| 4,096,068 A * | 6/1978 | Walker | B01D 24/14<br>210/293 |
| 4,096,911 A * | 6/1978 | Geske | B01D 24/24<br>166/234 |
| 4,196,079 A * | 4/1980 | Ward | B01D 24/4636<br>210/794 |
| 4,208,288 A * | 6/1980 | Stannard | B01D 24/24<br>210/279 |
| 4,214,992 A * | 7/1980 | Sasano | B01D 24/24<br>210/293 |
| 4,222,876 A * | 9/1980 | Englehart | B01D 24/24<br>210/293 |
| 4,331,542 A * | 5/1982 | Emrie | B01D 24/24<br>210/275 |
| 4,340,478 A * | 7/1982 | Stannard | B01D 29/03<br>210/293 |
| 4,564,450 A * | 1/1986 | Piper | B01D 39/2079<br>210/293 |
| 4,619,765 A * | 10/1986 | Roberts | B01D 24/24<br>210/450 |
| 4,923,606 A * | 5/1990 | Gresh | B01D 24/4631<br>210/275 |

(56) References Cited

U.S. PATENT DOCUMENTS

| | | | | |
|---|---|---|---|---|
| 5,019,259 A * | 5/1991 | Hambley | B01D 24/24 | 210/275 |
| 5,021,157 A * | 6/1991 | Drake | B01D 39/14 | 210/248 |
| 5,030,343 A * | 7/1991 | Urriola | E01F 5/00 | 210/170.03 |
| 5,053,124 A * | 10/1991 | Liane | A01K 1/0151 | 210/232 |
| 5,068,034 A * | 11/1991 | Walter | B01D 24/24 | 210/275 |
| 5,078,873 A * | 1/1992 | Black | B01D 24/4636 | 210/275 |
| 5,087,362 A * | 2/1992 | Brown | B01D 24/12 | 210/275 |
| 5,089,130 A * | 2/1992 | Nichols | B01D 24/4636 | 210/275 |
| 5,089,147 A * | 2/1992 | Ross | B01D 24/4869 | 210/275 |
| 5,108,627 A * | 4/1992 | Berkebile | B01D 24/24 | 210/275 |
| 5,118,419 A * | 6/1992 | Evans | B01J 8/0214 | 210/291 |
| 5,149,427 A * | 9/1992 | Brown | B01D 24/24 | 210/275 |
| 5,156,738 A * | 10/1992 | Maxson | B01D 24/4626 | 210/279 |
| 5,160,613 A * | 11/1992 | Walter | B01D 24/4631 | 210/275 |
| 5,160,614 A * | 11/1992 | Brown | B01D 24/4631 | 210/275 |
| 5,176,827 A * | 1/1993 | Walter | B01D 24/4626 | 210/275 |
| 5,232,585 A * | 8/1993 | Kanow | C02F 3/2806 | 210/275 |
| 5,232,592 A * | 8/1993 | Brown | B01D 24/24 | 210/275 |
| 5,269,920 A * | 12/1993 | Brown | B01D 24/24 | 210/275 |
| 5,296,138 A * | 3/1994 | Walter | B01D 24/24 | 210/275 |
| 5,328,608 A * | 7/1994 | Bergmann | B01D 24/4631 | 210/275 |
| 5,332,497 A * | 7/1994 | Shea | B01D 24/4626 | 210/275 |
| 5,489,388 A * | 2/1996 | Brown | B01D 24/4631 | 210/275 |
| 5,527,454 A * | 6/1996 | Ponte | C02F 3/04 | 210/151 |
| 5,618,421 A * | 4/1997 | Sorosinski | B01D 24/22 | 210/275 |
| 5,618,426 A * | 4/1997 | Eischen | B01D 24/4626 | 210/291 |
| 5,639,384 A * | 6/1997 | Brown | B01D 24/4631 | 210/275 |
| 5,865,999 A * | 2/1999 | Shea | B01D 24/24 | 210/291 |
| 5,891,335 A * | 4/1999 | Kupke | B01D 24/24 | 210/275 |
| 5,976,370 A * | 11/1999 | Medworth | B01D 24/4636 | 210/291 |
| 5,980,755 A * | 11/1999 | Roberts | C02F 3/104 | 210/275 |
| D422,061 S * | 3/2000 | Lee | D23/261 | |
| 6,048,132 A * | 4/2000 | Kupke | B01D 24/24 | 210/275 |
| 6,051,137 A * | 4/2000 | Deskins | B01D 24/4694 | 210/283 |
| 6,090,284 A * | 7/2000 | Melber | B01D 24/4631 | 210/275 |
| 6,143,188 A * | 11/2000 | Jantsch, Sr. | B01D 24/4626 | 210/275 |
| 6,159,384 A * | 12/2000 | Roberts | C02F 3/104 | 210/275 |
| 6,190,568 B1 * | 2/2001 | Hunkele | B01D 24/4631 | 210/792 |
| 6,255,102 B1 * | 7/2001 | Hallsten | B01D 53/85 | 55/494 |
| 6,261,453 B1 * | 7/2001 | Savage | B01D 24/4631 | 210/293 |
| 6,325,931 B1 * | 12/2001 | Roberts | B01D 24/001 | 210/275 |
| 6,569,327 B2 * | 5/2003 | Roberts | B01D 24/24 | 210/293 |
| 6,569,328 B1 * | 5/2003 | Haggard | B01D 24/24 | 210/275 |
| 6,615,469 B1 * | 9/2003 | Burcham | B01D 24/22 | 29/423 |
| 6,691,413 B2 * | 2/2004 | Haggard | B01D 24/4631 | 29/896.6 |
| 6,733,670 B2 * | 5/2004 | Kupke | B01D 24/22 | 210/275 |
| 6,740,237 B1 * | 5/2004 | Roberts | B01D 24/22 | 210/275 |
| 6,797,166 B1 * | 9/2004 | Hambley | B01D 24/24 | 210/275 |
| 6,830,684 B2 * | 12/2004 | Stegge | B01D 24/4631 | 210/275 |
| 6,982,034 B2 * | 1/2006 | Roberts | B01D 24/24 | 210/232 |
| 6,989,096 B2 * | 1/2006 | Roberts | B01D 24/4631 | 210/275 |
| 6,991,723 B2 * | 1/2006 | Roberts | B01D 24/4631 | 210/291 |
| 6,991,726 B2 * | 1/2006 | St. Germain | B01D 24/24 | 210/275 |
| D519,601 S * | 4/2006 | Addison | D23/209 | |
| 7,063,787 B2 * | 6/2006 | Jackson | B01D 24/4631 | 210/275 |
| 7,066,685 B2 * | 6/2006 | Humphries | E04C 2/427 | 210/163 |
| 7,074,329 B2 * | 7/2006 | Savage | B01D 24/24 | 210/293 |
| 7,090,771 B2 * | 8/2006 | Dyson | B01D 24/005 | 210/279 |
| 7,138,056 B2 * | 11/2006 | Hambley | B01D 24/24 | 210/275 |
| 7,141,164 B2 * | 11/2006 | Slack | B01D 24/24 | 210/232 |
| 7,192,521 B2 * | 3/2007 | St. Germain | B01D 24/24 | 210/275 |
| 7,288,193 B2 * | 10/2007 | Roberts | B01D 24/4631 | 210/411 |
| 7,288,194 B2 * | 10/2007 | Roberts | B01D 24/24 | 210/291 |
| 7,326,351 B2 * | 2/2008 | Hambley | B01D 24/4631 | 210/793 |
| D565,148 S * | 3/2008 | Addison | D23/209 | |
| 7,410,578 B2 * | 8/2008 | Hambley | B01D 24/24 | 228/178 |
| 7,481,930 B2 * | 1/2009 | Roberts | B01D 24/24 | 210/108 |
| 7,597,810 B2 * | 10/2009 | Furukawa | C08C 1/065 | 210/767 |
| 7,665,250 B2 * | 2/2010 | Powell | E04F 15/02411 | 52/297 |
| 7,736,506 B2 * | 6/2010 | Roberts | B01D 24/4631 | 210/275 |
| 7,754,089 B2 * | 7/2010 | Roberts | B01D 24/4861 | 210/275 |
| 7,788,867 B2 * | 9/2010 | Oates | G21C 9/012 | 52/302.1 |
| 7,820,043 B2 * | 10/2010 | Roberts | B01D 24/24 | 210/291 |
| D628,267 S * | 11/2010 | Dittmann | D23/209 | |
| 7,921,697 B2 * | 4/2011 | Roberts | B01D 35/143 | 210/741 |

(56) References Cited

U.S. PATENT DOCUMENTS

| | | | | |
|---|---|---|---|---|
| 7,922,903 | B2 * | 4/2011 | Roberts | B01D 24/4631 210/275 |
| 7,997,041 | B2 * | 8/2011 | Slack | B01D 24/4631 52/592.1 |
| 8,052,870 | B2 * | 11/2011 | Roberts | B01D 24/24 210/291 |
| 8,052,871 | B2 * | 11/2011 | Roberts | B01D 24/4631 210/489 |
| 8,069,630 | B2 * | 12/2011 | Slack | B01D 24/24 52/592.1 |
| 8,070,946 | B2 * | 12/2011 | Roberts | B01D 24/24 210/279 |
| 8,123,436 | B2 * | 2/2012 | Larach | E03F 1/005 405/36 |
| 8,177,970 | B2 * | 5/2012 | Bradley | B01D 24/4631 210/275 |
| 8,277,665 | B2 * | 10/2012 | Roberts | B01D 24/4631 210/795 |
| 8,323,514 | B2 * | 12/2012 | Geibel | B01D 24/46 210/291 |
| 8,333,889 | B2 * | 12/2012 | Roberts | B01D 24/24 210/275 |
| 8,343,343 | B2 * | 1/2013 | Kadakia | E03F 1/005 210/232 |
| 8,357,295 | B2 * | 1/2013 | Geibel | F16B 7/18 405/118 |
| 8,409,437 | B2 * | 4/2013 | Roberts | B01D 24/24 210/232 |
| D684,597 | S * | 6/2013 | Ball | D15/21 |
| 8,454,841 | B2 * | 6/2013 | Roberts | B01D 24/4631 210/795 |
| 8,491,787 | B2 * | 7/2013 | Wolf | B01D 24/22 210/291 |
| D687,861 | S * | 8/2013 | Ball | B01D 24/24 D15/21 |
| 8,652,328 | B2 * | 2/2014 | Roberts | B01D 24/4631 210/279 |
| 8,657,122 | B2 * | 2/2014 | Geibel | B01D 29/62 210/489 |
| 8,770,890 | B2 * | 7/2014 | May | E03F 5/101 405/51 |
| 8,871,093 | B2 * | 10/2014 | Ball | B01D 24/24 210/275 |
| 8,889,003 | B2 * | 11/2014 | Berkebile | B01D 24/46 210/275 |
| 8,889,015 | B2 * | 11/2014 | Roberts | B01D 24/4631 210/795 |
| 8,985,897 | B2 * | 3/2015 | Boulton | E03B 11/14 405/36 |
| 8,992,774 | B2 * | 3/2015 | Roberts | B01D 29/66 210/275 |
| 9,017,554 | B2 * | 4/2015 | Bruce | B01D 24/24 210/293 |
| 9,057,188 | B2 * | 6/2015 | Burkhart, Sr. | E03F 5/101 |
| 9,072,989 | B2 * | 7/2015 | Roberts | B01D 24/24 |
| 9,072,990 | B2 * | 7/2015 | Berkebile | B01D 24/001 |
| 9,138,665 | B2 * | 9/2015 | Ball | B01D 24/24 |
| 9,206,574 | B2 * | 12/2015 | Parker | E02B 11/005 |
| 9,320,991 | B2 * | 4/2016 | Meurer | B01D 24/24 |
| 9,468,869 | B2 * | 10/2016 | Roberts | B01D 24/4631 |
| D773,018 | S * | 11/2016 | Geibel | D23/267 |
| 9,480,939 | B2 * | 11/2016 | Ball | B01D 24/24 |
| 9,517,947 | B2 * | 12/2016 | Roberts | B01D 24/4631 |
| 9,546,044 | B2 * | 1/2017 | Boulton | E03B 11/14 |
| 9,580,899 | B2 * | 2/2017 | Rotondo | B65G 5/00 |
| 9,593,783 | B2 * | 3/2017 | Parker | E02D 31/02 |
| 9,656,190 | B2 * | 5/2017 | Meurer | B29C 48/11 |
| 9,731,228 | B2 * | 8/2017 | Roberts | B01D 24/24 |
| 9,764,259 | B2 * | 9/2017 | Geibel | B01D 24/24 |
| 9,931,588 | B2 * | 4/2018 | Meurer | B01D 24/24 |
| 9,987,569 | B2 * | 6/2018 | Roberts | B01D 24/24 |
| 10,022,654 | B2 * | 7/2018 | Berkebile | B01D 24/24 |
| 10,052,572 | B2 * | 8/2018 | Berkebile | B01D 29/62 |
| 10,112,128 | B2 * | 10/2018 | Berkebile | B01D 24/24 |
| 10,143,944 | B2 * | 12/2018 | Haggard, Sr. | B01D 24/4631 |
| 10,151,099 | B2 * | 12/2018 | Ekholm | B01D 24/4631 |
| 10,173,150 | B2 * | 1/2019 | Geibel | B01D 24/001 |
| 10,238,996 | B2 * | 3/2019 | Meurer | B01D 24/24 |
| 10,376,817 | B2 * | 8/2019 | Roberts | B01D 24/4631 |
| 10,478,757 | B2 * | 11/2019 | Roeser | B01D 24/001 |
| 10,518,440 | B2 * | 12/2019 | Kloet | B28B 23/04 |
| 10,525,382 | B2 * | 1/2020 | Geibel | B01D 24/24 |
| 10,612,227 | B2 * | 4/2020 | Elliott, Jr. | E03F 1/005 |
| 10,625,183 | B2 * | 4/2020 | Meurer | B01D 24/24 |
| 10,626,580 | B2 * | 4/2020 | Kent | F17C 3/005 |
| 10,682,592 | B2 * | 6/2020 | Sweeney | B01D 24/24 |
| 10,738,455 | B2 * | 8/2020 | Burkhart, Sr. | E03F 1/002 |
| 10,881,989 | B2 * | 1/2021 | Berkebile | B01D 24/4636 |
| 10,881,990 | B2 * | 1/2021 | Geibel | B01D 24/4636 |
| 10,913,014 | B2 * | 2/2021 | Berkebile | B01D 24/24 |
| 10,941,050 | B2 * | 3/2021 | Faaborg | B01D 24/24 |
| 10,960,326 | B2 * | 3/2021 | Roberts | B01D 24/24 |
| 10,981,089 | B2 * | 4/2021 | Meurer | B29C 48/11 |
| 11,058,973 | B2 * | 7/2021 | Ekholm | B01D 24/24 |
| 11,389,807 | B2 * | 7/2022 | Sternberg | E02B 11/005 |
| 11,536,017 | B2 * | 12/2022 | VanHoose | E03F 5/10 |
| 11,566,411 | B2 * | 1/2023 | Schorstein | E03F 1/005 |
| 11,596,878 | B2 * | 3/2023 | Meurer | B01D 24/24 |
| 11,780,741 | B2 * | 10/2023 | Faaborg | B01D 24/14 210/291 |
| 11,851,867 | B1 * | 12/2023 | Holbrook | E03F 5/101 |
| 11,980,835 | B2 * | 5/2024 | Zarraonandia | B01D 29/33 |
| 12,059,637 | B2 * | 8/2024 | Roberts | C02F 1/001 |
| 2001/0032813 | A1 | 10/2001 | Savage | B01D 24/4631 210/293 |
| 2002/0096463 | A1 * | 7/2002 | Roberts | B01D 24/38 210/275 |
| 2002/0166807 | A1 * | 11/2002 | Haggard | B01D 24/4631 210/275 |
| 2003/0006183 | A1 * | 1/2003 | Jackson | B01D 24/4631 210/291 |
| 2003/0047502 | A1 * | 3/2003 | Roberts | B01D 24/4631 210/293 |
| 2003/0080040 | A1 * | 5/2003 | Savage | B01D 24/24 210/292 |
| 2003/0118404 | A1 * | 6/2003 | Lee | E02D 31/06 52/783.15 |
| 2003/0132169 | A1 * | 7/2003 | Hambley | B01D 24/4631 210/744 |
| 2003/0201219 | A1 * | 10/2003 | Roberts | B01D 24/38 210/274 |
| 2004/0000512 | A1 * | 1/2004 | Germain | B01D 24/24 210/293 |
| 2004/0007541 | A1 * | 1/2004 | Stegge | B01D 24/4631 210/275 |
| 2004/0031743 | A1 * | 2/2004 | Roberts | B01D 24/24 210/293 |
| 2005/0133434 | A1 * | 6/2005 | Hambley | B01D 24/001 210/291 |
| 2005/0194302 | A1 * | 9/2005 | Roberts | B01D 24/4631 210/293 |
| 2005/0218061 | A1 * | 10/2005 | Slack | B01D 24/24 210/275 |
| 2005/0232701 | A1 * | 10/2005 | Humphries | E04C 2/427 405/43 |
| 2006/0086653 | A1 * | 4/2006 | St. Germain | B01D 24/24 210/293 |
| 2006/0108275 | A1 * | 5/2006 | Cote | B01D 61/18 210/321.72 |
| 2006/0113234 | A1 * | 6/2006 | Roberts | B01D 24/4631 210/291 |
| 2006/0118473 | A1 * | 6/2006 | Roberts | B01D 24/4631 210/275 |
| 2006/0186062 | A1 * | 8/2006 | Pauwels | C02F 1/004 210/291 |
| 2007/0023346 | A1 * | 2/2007 | Roberts | B01D 24/008 210/293 |
| 2007/0175832 | A1 * | 8/2007 | Roberts | B01D 24/4631 210/275 |

(56) References Cited

U.S. PATENT DOCUMENTS

| | | | |
|---|---|---|---|
| 2007/0190865 A1* | 8/2007 | Slack | B01D 24/24 439/716 |
| 2007/0215555 A1* | 9/2007 | Furukawa | C08F 6/20 210/728 |
| 2007/0235382 A1* | 10/2007 | Roberts | B01D 24/24 210/293 |
| 2008/0000825 A1* | 1/2008 | Roberts | B01D 24/24 210/293 |
| 2008/0099411 A1* | 5/2008 | Roberts | B01D 24/24 210/291 |
| 2008/0099412 A1* | 5/2008 | Roberts | B01D 24/4631 210/291 |
| 2008/0190835 A1* | 8/2008 | Addison | B01D 24/24 210/291 |
| 2008/0216437 A1* | 9/2008 | Prevost | E01C 13/08 52/673 |
| 2009/0014374 A1* | 1/2009 | Slack | B01D 24/24 210/236 |
| 2009/0071914 A1* | 3/2009 | Roberts | B01D 24/4631 210/291 |
| 2009/0184038 A1* | 7/2009 | Graham | B01D 24/24 210/189 |
| 2010/0089810 A1* | 4/2010 | Bradley | B01D 24/24 210/151 |
| 2010/0237025 A1* | 9/2010 | Geibel | B01D 24/24 210/791 |
| 2010/0282651 A1* | 11/2010 | Roberts | B01D 24/4631 210/90 |
| 2010/0300954 A1* | 12/2010 | Roberts | B01D 24/4631 210/275 |
| 2010/0314305 A1* | 12/2010 | Kadakia | E03F 1/005 29/527.1 |
| 2011/0073549 A1* | 3/2011 | Geibel | B01D 29/62 210/291 |
| 2011/0174719 A1* | 7/2011 | Berkebile | B01D 24/46 210/275 |
| 2011/0226687 A1* | 9/2011 | Roberts | B01D 24/24 137/15.01 |
| 2011/0278238 A1* | 11/2011 | Roberts | B01D 24/305 210/279 |
| 2012/0048793 A1* | 3/2012 | Roberts | B01D 24/24 210/293 |
| 2012/0097594 A1* | 4/2012 | Bruce | B01D 24/24 29/418 |
| 2012/0111777 A1* | 5/2012 | Roberts | B01D 24/4626 210/232 |
| 2012/0211444 A1* | 8/2012 | Roberts | B01D 24/24 210/792 |
| 2013/0134086 A1* | 5/2013 | Roberts | B01D 24/4631 210/411 |
| 2013/0180906 A1* | 7/2013 | Ball | B01D 24/24 210/232 |
| 2013/0199990 A1* | 8/2013 | Berkebile | B01D 24/46 29/428 |
| 2013/0240433 A1* | 9/2013 | Roberts | C02F 1/001 210/388 |
| 2013/0306542 A1* | 11/2013 | Roberts | B01D 24/24 210/291 |
| 2014/0021121 A1* | 1/2014 | Ball | B01D 24/24 210/275 |
| 2014/0131262 A1* | 5/2014 | Roberts | B01D 24/4631 210/151 |
| 2014/0166567 A1* | 6/2014 | Sweeney | B01D 24/24 210/293 |
| 2014/0166593 A1* | 6/2014 | Berkebile | B01D 24/24 210/794 |
| 2014/0217039 A1* | 8/2014 | Geibel | B01D 24/4631 210/791 |
| 2014/0251439 A1* | 9/2014 | Ball | B01D 24/24 137/1 |
| 2014/0356066 A1* | 12/2014 | Meurer | B01D 24/24 405/43 |
| 2014/0360591 A1* | 12/2014 | Roberts | B01D 24/4631 137/544 |
| 2015/0014259 A1* | 1/2015 | Ball | B01D 24/4631 210/151 |
| 2015/0033644 A1* | 2/2015 | Mesquita E Silva Ferreira De Araujo | E04B 1/34823 52/220.1 |
| 2015/0068988 A1* | 3/2015 | Roberts | B01D 24/205 210/792 |
| 2015/0068989 A1* | 3/2015 | Roberts | B01D 24/24 210/795 |
| 2015/0151914 A1* | 6/2015 | Boulton | B65G 5/00 210/170.03 |
| 2015/0190737 A1* | 7/2015 | Geibel | B01D 24/24 210/293 |
| 2015/0196858 A1* | 7/2015 | Berkebile | B01D 24/46 210/293 |
| 2015/0231534 A1* | 8/2015 | Berkebile | B01D 24/4636 210/791 |
| 2015/0273364 A1* | 10/2015 | Roberts | B01D 24/24 210/269 |
| 2015/0343335 A1* | 12/2015 | Berkebile | B01D 24/001 210/275 |
| 2015/0376889 A1* | 12/2015 | Ekholm | B01D 24/4631 210/163 |
| 2016/0067633 A1 | 3/2016 | Jara et al. | |
| 2016/0097175 A1* | 4/2016 | Parker | E03F 1/005 405/184.4 |
| 2016/0116112 A1* | 4/2016 | Bradfield | E03F 1/005 405/126 |
| 2016/0121240 A1* | 5/2016 | Geibel | B01D 24/001 210/291 |
| 2016/0193550 A1* | 7/2016 | Meurer | B01D 24/4636 210/293 |
| 2016/0243467 A1* | 8/2016 | Sweeney | B01D 24/24 |
| 2016/0256800 A1* | 9/2016 | Berkebile | B01D 24/4631 |
| 2016/0348350 A1* | 12/2016 | Burkhart, Sr. | E03F 1/005 |
| 2017/0239595 A1* | 8/2017 | Meurer | B01D 24/24 |
| 2017/0296945 A1* | 10/2017 | Roeser | B01D 24/24 |
| 2017/0304748 A1* | 10/2017 | Roberts | B01D 24/305 |
| 2017/0319989 A1* | 11/2017 | Haggard, Sr. | B01D 24/24 |
| 2017/0348617 A1* | 12/2017 | Geibel | B01D 24/24 |
| 2018/0021702 A1* | 1/2018 | Sweeney | B01D 24/24 210/293 |
| 2018/0214796 A1* | 8/2018 | Meurer | B01D 24/4636 |
| 2018/0333659 A1* | 11/2018 | Berkebile | B01D 24/001 |
| 2018/0333660 A1* | 11/2018 | Geibel | B01D 24/24 |
| 2018/0339246 A1* | 11/2018 | Roberts | B01D 24/24 |
| 2019/0217224 A1* | 7/2019 | Meurer | B01D 24/4636 |
| 2019/0218764 A1* | 7/2019 | Ekholm | B01D 24/4631 |
| 2020/0016517 A1* | 1/2020 | Roberts | B01D 24/305 |
| 2020/0246728 A1* | 8/2020 | Meurer | B01D 24/4636 |
| 2020/0248442 A1* | 8/2020 | Yuki | E03F 1/005 |
| 2020/0256048 A1* | 8/2020 | Crowther | B65D 90/513 |
| 2020/0290891 A1* | 9/2020 | Faaborg | C02F 1/004 |
| 2021/0052994 A1* | 2/2021 | Ekholm | B01D 24/4631 |
| 2021/0188660 A1* | 6/2021 | Faaborg | B01D 24/24 |
| 2021/0229003 A1* | 7/2021 | Meurer | B01D 24/24 |
| 2022/0081889 A1* | 3/2022 | May | E01F 5/005 |
| 2022/0112705 A1* | 4/2022 | Zarraonandia | B01D 21/0012 |
| 2022/0372743 A1* | 11/2022 | Schorstein | E01F 5/005 |
| 2023/0030089 A1* | 2/2023 | VanHoose | E03F 5/10 |
| 2023/0053228 A1* | 2/2023 | Roberts | C02F 1/004 |
| 2023/0235519 A1* | 7/2023 | Schorstein | E03F 3/046 210/164 |
| 2023/0303414 A1* | 9/2023 | Ekholm | C02F 3/104 |
| 2024/0238699 A1* | 7/2024 | Roberts | C02F 1/001 |
| 2024/0335770 A1* | 10/2024 | Mukadam | B01D 24/24 |

\* cited by examiner

MEDIA RETENTION PLATE FOR A BLOCK UNDERDRAIN SYSTEM

CROSS-REFERENCE TO RELATED APPLICATION

This application claims the benefit of Provisional U.S. patent application No. 63/494,138, filed Apr. 4, 2023, the entire content and disclosure of which, both express and implied, is incorporated herein by reference.

FIELD OF THE INVENTION

The present invention relates to media retention plates for block underdrain systems, and in particular, to a media retention plate having a plurality of fluid slots.

BACKGROUND

Water, wastewater, and industrial filtration systems are used to filter particles suspended in the fluid under consideration. These systems have an underdrain system for supporting filter media and spacing the filter media, such as, but not limited to sand and anthracite, apart from the bottom of the filter. Filter media can remove particulates, including dirt and debris, along with chemical or 3 biological contaminants from a fluid flowing through the filter media. Formations of underdrain blocks are often used to construct the underdrain system.

FIGS. 1A-1B show a plan view and a cross-sectional view, respectively, of Applicant's underdrain block 10, as disclosed in U.S. Pat. No. 8,343,343, the contents of which are incorporated herein in its entirety. The underdrain block 10 has a top wall 5, a bottom wall 6, a pair of opposing end walls 20 and a pair of opposing side walls 15. The underdrain block 10 also includes a center separation wall 25 that extends horizontally between the pair of opposing end walls 20. The center separation wall 25 extends vertically from at or near the top wall 5 to the bottom wall 6. The center separation wall 25 can divide the underdrain block 10 into two longitudinal sections. Lateral separation walls 50 may be formed in each longitudinal section thereby forming primary laterals 35 (or primary distribution conduits) and secondary laterals 40 (or secondary distribution conduits). The lateral separation walls 50 separate the primary laterals 35 from the secondary laterals 40. Further, the center separation wall 25 separates the primary laterals 35 from each other and separates the secondary laterals 40 from each other.

The underdrain block 10 may include apertures 30 formed therein. As used herein, the term "aperture" refers to a hole, gap, crack, slit, or opening of any kind. In the underdrain block illustrated in FIGS. 1A and 1B, the apertures 30 are formed in the center separation wall 25 at opposing ends of the center separation wall 25 along the direction in which the center separation wall 25 extends between the pair of opposing end walls 20. The apertures 30 may be throughholes that extend entirely or substantially entirely through a height of the center separation wall 25. The height of the center separation wall 25 refers to a distance that the center separation wall 25 extends from at or near the top wall 5 to the bottom wall 6. At least one of the apertures 30 formed in the center separation wall 25 of the underdrain block 10 is capable of receiving a support member. The underdrain block 10 is shaped to collect the filtered water that passes through the filter media. The underdrain block 10 can have a low profile, cover the floor of the filter bed, and support the filter media. The low-profile design increases the volume of liquid being filtered and reduces development of biological/chemical scaling.

In block underdrain systems, multiple underdrain blocks (such as, multiple underdrain blocks 10) can be placed side-by-side and end-to-end in the bottom of the filter to form a filter floor. Filter media can be poured over the underdrain blocks to capture dirt and other particulate matters from a liquid (such as, water) that is filtered as it passes through the filter media. The blocks can have a low profile, cover the floor of the filter bed, and support the filter media. The low-profile design increases the volume of liquid being filtered and reduces development of biological/chemical scaling.

In addition to providing support for the filter media, underdrain systems serve two primary purposes: to collect the filtered water that passes through the filter media and to uniformly distribute backwash water, backwash air, or a combination of both, across the filter. Backwash is a process where a clean backwash fluid or gas, or a mixture thereof, is pumped separately or concurrently, into an underdrain block to remove solid particles or other unwanted materials from the filter media. Typically, the backwash fluid is clean water and the gas used is air.

The underdrain blocks also form a barrier to physically separate the filter media from the air and water distribution laterals designed into the blocks. Separating the filter media from the blocks prevents the finer particles of the filter media from clogging the laterals. Conventionally, graded gravel layers are utilized to prevent the passage of filter media into the filter floor. However, using gravel layers decreases the available space for media and causes the filter structure to be deeper. As an alternative to gravel layers, media retention plates can be utilized to prevent the filter media from passing through into the underdrain system and facilitate case of media replacement. In use, each filter block can be pre-assembled with a fitted media retention plate. The media retention plates also help retain the filter media on top of the underdrain blocks.

Air can be distributed evenly across the entire filter bottom area to scour the filter media and to provide an air lift which, with the water, removes the released solids from the filter. Air scouring involves the injection of controlled filtered air through the media retention plate into the filter media (or filter or media, these terms used interchangeably herein). This process is further followed by water backwash to increase the motive force and pushing the particles upwards, later the air is turned off and only water is used to remove the dirty water containing these particles out of the system. The use of concurrent or sequential air and water significantly reduces the volume of dirty backwash water produced and drastically lowers operating costs through the uniform backwash process. The pressurized air/water combination causes the filtered water to be passed upward through the media with sufficient velocity to prevent filter problems such as mud balls, filter cracking, agglomeration buildup on the media grains, and inactive areas within the filter.

In a conventional block underdrain filtration system, fluid passes through the underdrain blocks at a high rate during the backwash process. Backwash water enters into the primary laterals and then passes through control orifices into two secondary laterals. Backwash air is distributed by the design of upper control orifices between the primary and secondary laterals, providing even air distribution. Backwash, therefore, improves the performance of the filter media. The process also results in expansion of the media bed on top of the media retention plate. The media retention plate plays an important part in air scouring process.

Certain conventional media retention plates include compressed high density polymer beads. The use of polymer beads creates a porous filter/plate which can be utilized as the filter bed and media retention bed. The process results in pores having variable sizes and uneven spacing between the pores. While the pores are usually sized smaller than conventional filter media, filter media can occasionally penetrate the pores and clog/plug the media retention plate. This in turn results in a reduction of overall filter efficiency and performance. The uneven pore distribution over the media retention plate and the varying pore sizes also results in uneven flow distribution over the filter bed. Due to the uneven pore sizes and spacing/distribution, there is uneven collapse pulse behavior on top of the filter bed during a backwash operation. The uneven pore distribution can result in caking of the filter media on top of the filter bed due to an uneven collapsed pulse effect. This causes the backwash process to become ineffective, thus increasing the overall operational cost of the underdrain system. Conventional media retention plates are also prone to bending over the edges of the filter block causing the filter to leak, in turn causing substantial failure points for the filter.

U.S. Pat. Pub. No. 20180333660 discloses a media retention plate having multiple hopper-shaped compartments formed on the top surface and having a first sloped wall and a second sloped wall angled toward the first sloped wall in a direction from the top surface toward the bottom surface. The plate further has at least one first slot extending through at least one of the first sloped wall and the second sloped wall, and at least one second slot extending through the top sidewall. Other prior art media retention plates involve an upper and a lower media retention plate. A potential drawback with such designs is the difficulty to manufacture with repeatability as tolerance from the two plates can stack up, and inconsistencies in one plate can cause failure of the filter assembly. It is also more expensive as two pieces are required for one filter, and secondary operations increase as the upper and lower plates need to be put together.

Accordingly, there is a need for an improved media retention plate for block underdrain systems that can ensure optimized fluid flow into the underdrain filter blocks during operation, and an even flow distribution through the filter media during the air-water backwash process.

SUMMARY OF THE INVENTION

In accordance with one or more embodiments, the invention relates to an improved media retention plate (also referred interchangeably as "plate") for block underdrain systems. In particular, the invention includes a singular (or one) media retention plate for an underdrain block. The media retention plate is configured with multiple precision-engineered slots for passage of two fluids having different densities. As used herein, the term "slot" includes, without limitation, a slot, slit, aperture, cutout, or an opening in the media retention plate. In an exemplary embodiment, the first fluid is air while the second fluid is water. Each slot is configured to allow the passage of only one of these fluid types during an air-water backwash process.

The air and water slots are positioned along the media retention plate to facilitate an optimal flow in and out of the plate while prohibiting media pass through. The plate prevents media loss through the filter floor while increasing available filter headroom.

The media retention plate facilitates an optimal collapse pulse by allowing the water to flow back into the filter block through the water retention slots while maintaining the flow of air through the air distribution slots. This allows for proper agitation of the filter media on top of the media retention plate due to the vortices created on top of the media retention plate. The collapsed pulse effect creates turbulence due to the energy dispersion of the rising bubbles and allows the expansion of the media bed by separating the media. The proper agitation of the filter media increases the effectiveness of cleaning the filter media and decreases overall backwash time, thus saving on operating costs. This improves the overall performance of the block underdrain system by improving the backwash process.

In a conventional block underdrain filtration system, fluid passes through the underdrain blocks at a high rate during the backwash process. This creates an increasing velocity flow profile due to the two primary laterals of the underdrain block. (It is noted, however, that some underdrain filter blocks include only one primary lateral.) To regulate the velocity, two secondary laterals are installed in the filter block. The two primary and second laterals allow the flow velocity to get regulated to a much more stable profile. However, due to the overall long length of these underdrain filter systems, maintaining this stable profile cannot be guaranteed. Accordingly, in one or more embodiments, the slots on the media retention plate of the present invention are configured on a downward sloping surface to stabilize the velocity of the fluid flow. This can ensure that the filter is used optimally in all given situations/conditions. Back pressure on the media retention plate can be essentially reduced by the pre-engineered angular slots by increasing the volume between the fluid outlet slots and orifices while maintaining an optimal pressure inside the filter block.

In one or more embodiments, a plurality of inserts or legs are located at the base of the bottom surface of the plate for secure installation with the filter block. This design also improves the structural integrity of the filter block assembly and prevent uplift of the media retention plate. During a backwash process, the media retention filter can experience pressure on the bottom surface. This pushes the filter away from the filter block creating a point for leakage. This causes an overall reduction in system performance and can result in system failure. The inserts, in addition to ensuring structural integrity, can also ensure that the media retention plate with the filter bed stays stable under pressure conditions created during the backwash process. In one or more embodiments, the inserts are configured to engage with the filter block, and an adhesive or a sealant can be utilized along with screws or other securing means to affix the media retention plate to the filter block.

BRIEF DESCRIPTION OF THE DRAWINGS

The invention will be described in further detail below and with reference to the attached drawings all of which describe or relate to apparatus, systems and methods of the present invention. In the figures, which are not intended to be drawn to scale, each similar component that is illustrated in various figures is represented by a like numeral. In the figures.

DETAILED DESCRIPTION OF THE INVENTION

Figure 1A:
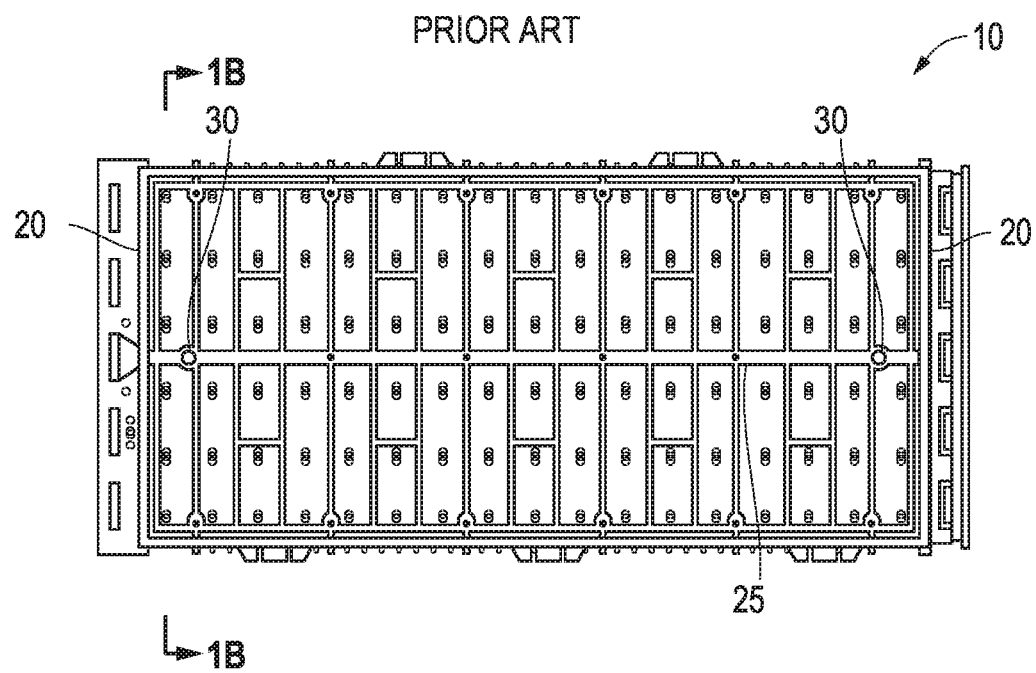
FIGS. 1A-1B illustrate an exemplary prior art underdrain block.

Depending on the context, all references below to the "invention" may in some cases refer to certain specific embodiments only. Various terms are used herein. To the extent a term used in a claim is not defined below, it should be given the broadest definition persons in the pertinent art have given that term as reflected in printed publications and issued patents at the time of filing.

According to an embodiment, a media retention plate for an underdrain filter block has: a top surface, and a bottom surface opposite the top surface; a pair of opposing sidewalls, and a pair of opposing end walls, the pair of opposing sidewalls and the pair of opposing end walls together connecting the top surface and the bottom surface; a plurality of plate sections formed on the top surface, wherein each internal section includes one or more air slots and one or more water slots; and a plurality of inserts arranged along a perimeter of a basal portion of the bottom surface, wherein each insert is configured for affixation to a top surface of the underdrain filter block.

The media retention plate further comprises a first set of inner walls, wherein each inner wall in the first set of inner walls extends from a first end wall to a second end wall. The media retention plate further comprises a second set of inner walls, wherein each inner wall in the second set of inner walls extends from a first sidewall to a second sidewall. Each wall in the first set of inner walls intersects with a corresponding wall in the second set of inner walls to form the plurality of plate compartments or sections. Each plate section further comprises a central protrusion, the central protrusion flanked on either side by a pair of opposing downward sloping surfaces.

An air slot is formed along a first intersection, wherein the first intersection is formed by intersecting a lower edge of the central protrusion and a first end of a downward sloping surface. Similarly, a pair of air slots can be formed on the opposite sides of the central protrusion, along the intersection of the lower edge of the central protrusion and the first end of each downward sloping surface. The air slots extend along the width of the first intersection.

A water slot is formed along a second intersection, wherein the second intersection is formed by intersecting a second end of a downward sloping surface and a top portion of the bottom surface of the media retention plate. Similarly, a pair of water slots can be formed by intersecting the second end of each downward sloping surface and the bottom surface of the media retention plate. The water slots extend along the width of the second intersection.

The width of the one or more air and water slots is pre-engineered to ensure retention of filter media positioned over the media retention plate.

The media retention plate is configured to facilitate flow back of water into the underdrain block through the one or more water slots while maintaining air flow through the one or more air slots to create an optimal collapse pulse. The one or more air and water slots are evenly sized and evenly spaced apart to facilitate the creation of a relatively smaller-sized collapse pulse during a sequential air-water backwash.

According to another embodiment, a method of manufacturing a media retention plate for an underdrain filter block having a top surface, and a bottom surface opposite the top surface; a pair of opposing sidewalls, and a pair of opposing end walls, the pair of opposing sidewalls and the pair of opposing end walls together connecting the top surface and the bottom surface; a plurality of plate sections formed on the top surface, wherein each internal section includes one or more air slots and one or more water slots; and a plurality of inserts arranged along a perimeter of a basal portion of the bottom surface, wherein each insert is configured for affixation to a top surface of the underdrain filter block, involves: utilizing a pair of first and second mold blocks to create the first and second slots. The method further involves pressing a first mold block upward towards the central protrusion to create one or more air slots and pressing a second mold block downward on the downward sloping surfaces to create one or more water slots.

Figure 1B:
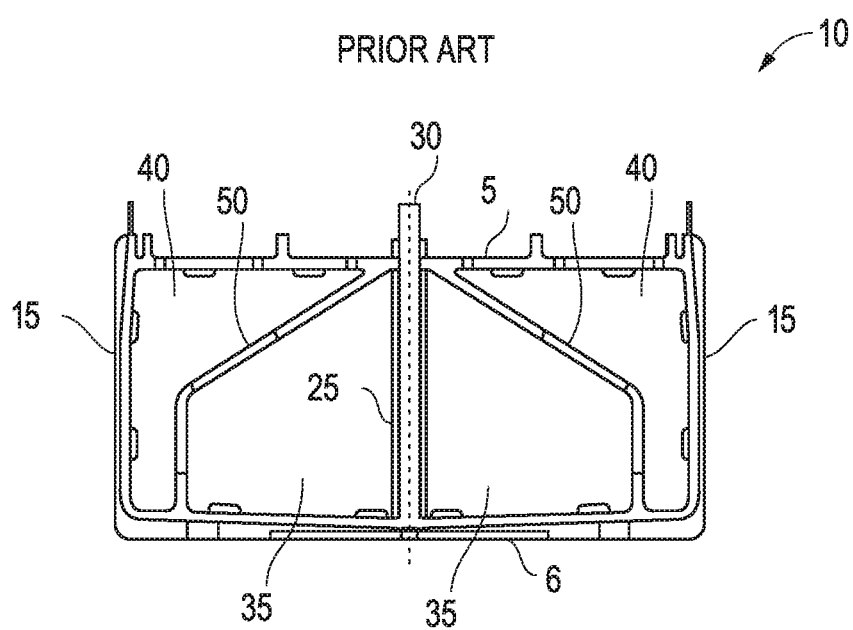
Figure 2A:
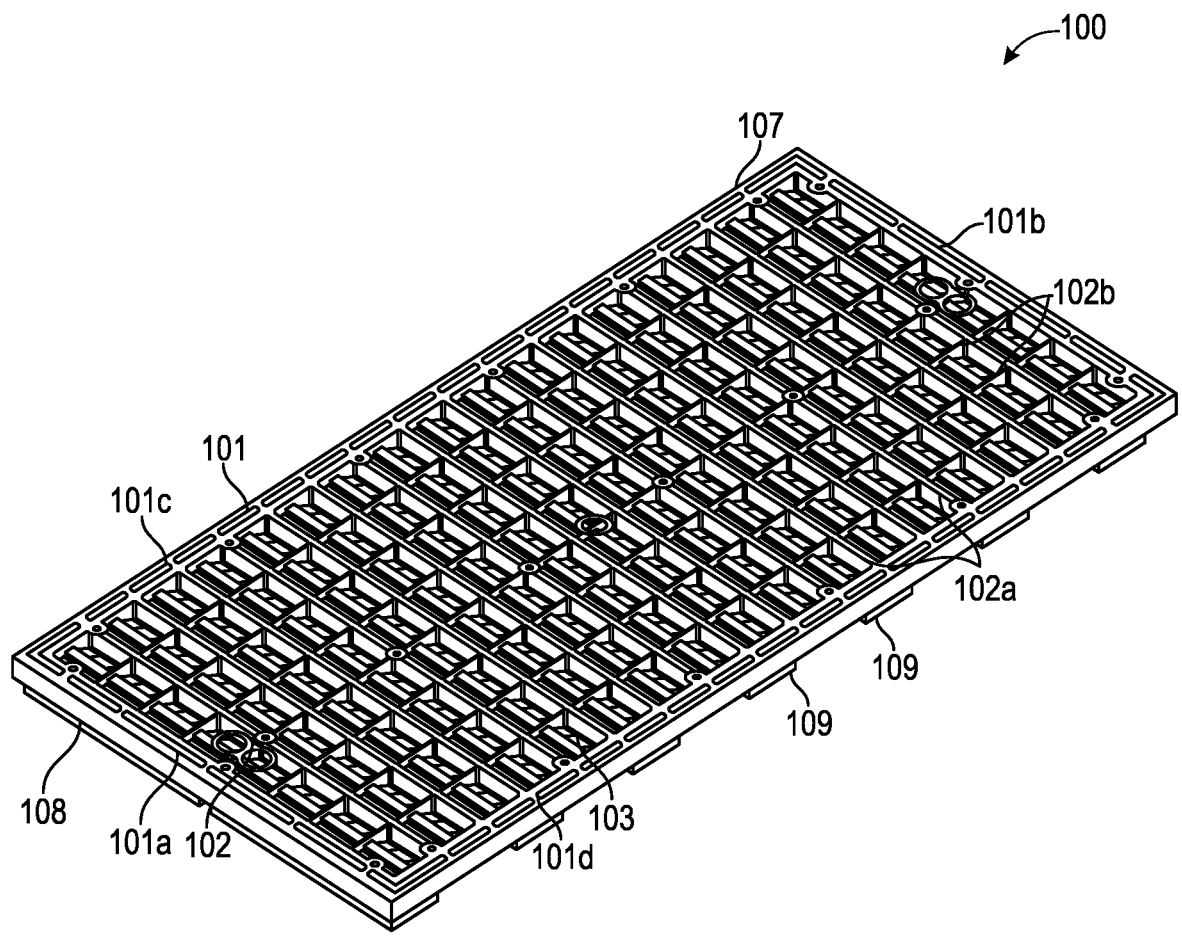
FIGS. 2A-2B illustrate a media retention plate for an underdrain block according to an embodiment.
Figure 2B:
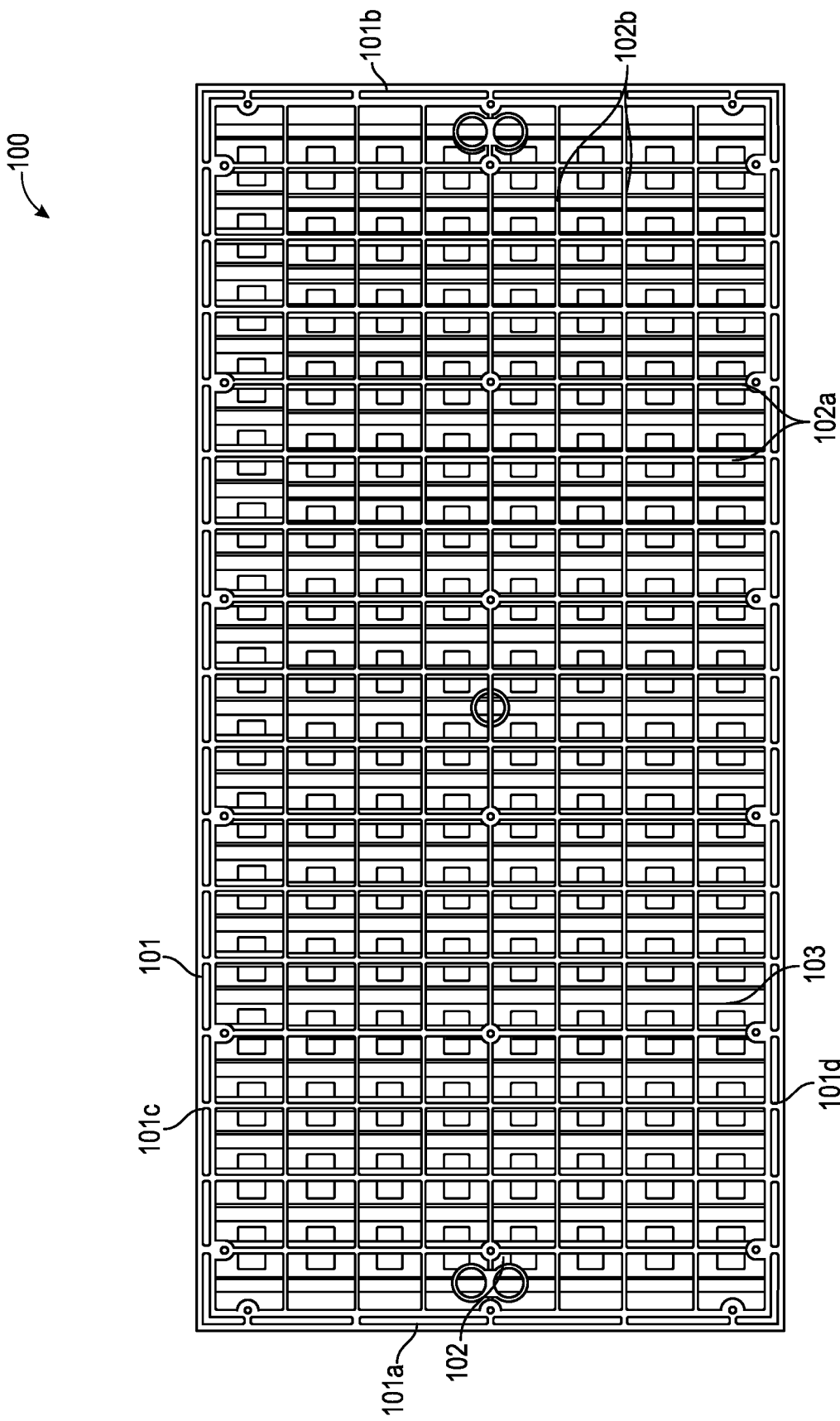

As shown in FIGS. 2A-2B, the present invention involves an improved media retention plate for an underdrain system having at least one underdrain block (such as, underdrain block 10 disclosed in FIGS. 1A-1B). The media retention plate is configured to be mounted on top of the underdrain block. One or more layers of filter media (not shown) can be positioned over the media retention plate. The filter media can be of any type known in the art. For example, it can include, without limitation, sand or gravel.

The media retention plate has evenly (or consistently) sized and evenly spaced apart slots for entry and exit of air and water. The slots are further configured with an angular profile and are separated by baffle or sidewalls. The slots can prohibit the filter media from passing through to the filter block to prevent media loss during process flow. The slots are configured to achieve a consistent, well distributed backwash fluid flow through the media retention plate into the filter media bed.

The size and spacing of the slots facilitate the creation of relatively smaller-sized collapse pulse during the backwash due to a pressure differential in the fluids at the top surface of the media retention plate. The smaller-sized collapse pulse allows high energy dissipation in the filter media and facilitates its agitation for proper media cleansing. The surface of the filter media can be cleaned using vortices created during the backwash flow because of the angled slots with separation baffles. The filter media and media retention plate are optimally cleaned using the agitation of the filter media caused by the collapse pulse.

The one or more embodiments of the present invention improves the back pressure handling capabilities of the block underdrain system by utilizing dual air and water slots having a predetermined width and inserts on the bottom surface of the media retention plate. Additionally, water retention during the process flow and air scouring backwash is improved by utilizing separate air and water slots.

As shown in FIGS. 2A and 2B, the filter media retention plate 100 has a top surface 107, an opposing bottom surface 108. The media retention plate 100 is configured to extend longitudinally between opposing ends of an underdrain block (not shown). A first pair of opposing sidewalls 101c and 101d is arranged substantially parallel to each other and a second pair of opposing end walls 101a and 101b is arranged substantially parallel to each other. Each sidewall is connected to both end walls 101a, 101b. Additionally, the opposing sidewalls and end walls connect the top and bottom surfaces of the media retention plate 100. The media retention plate 100 can be rectangular or square in shape. However, it is understood that the media retention plate 100 can have any other suitable shape. The media retention plate 100 further has a set of inner walls 102. A first set of inner walls 102*a* extends longitudinally from end walls 101*a* to 101*b* and perpendicular to sidewalls 101*c*, 101*d*. The first set of inner walls 102*a* is arranged in a linear pattern spanning from or from proximal to sidewall 101*a* to proximal to sidewall 101*b*. Similarly, a second set of inner walls 102*b* is configured to extend from a first sidewall 101*c* to a second sidewall 101*d* and perpendicular to end walls 101*a*, 101*b*. The second set of inner walls 102*b* is arranged in a linear pattern spanning from or from proximal to sidewall 101*c* to proximal to sidewall 101*d*. The addition of the inner walls 102 improves the overall structural integrity throughout the media retention plate 100. Each wall in the first set of inner walls intersects with a corresponding wall in the second set of inner walls to form a plurality of plate compartments or plate sections 103 (as described hereinafter). The intersecting inner walls function as baffle walls or separation walls for air and water slots (120 and 130) formed on the surface of the media retention plate 100.

Filter media (not shown), poured over the media retention plate 100, can be agitated due to the vortices created by the collapse pulse effect created due to the bubbles collapsing as they move upward through the media bed for proper cleaning of the filter media. The collapse pulse is caused by the pressure differential created by the high pressure at the bottom of the plate 108 and low pressure at the top 107 of the media retention plate 100.

The media retention plate 100 is configured to be securely fitted or coupled to a conventional filter block (not shown) for an underdrain system to prevent loss of filter media and to better maintain backwash pressure. Additionally, since the media retention plate 100 substantially eliminates filtration media loss, the operating cost of the backwash process is reduced. This improves overall performance of the underdrain system by improving the backwash process due to improved air and water flow through the filter blocks.

Figure 3A:
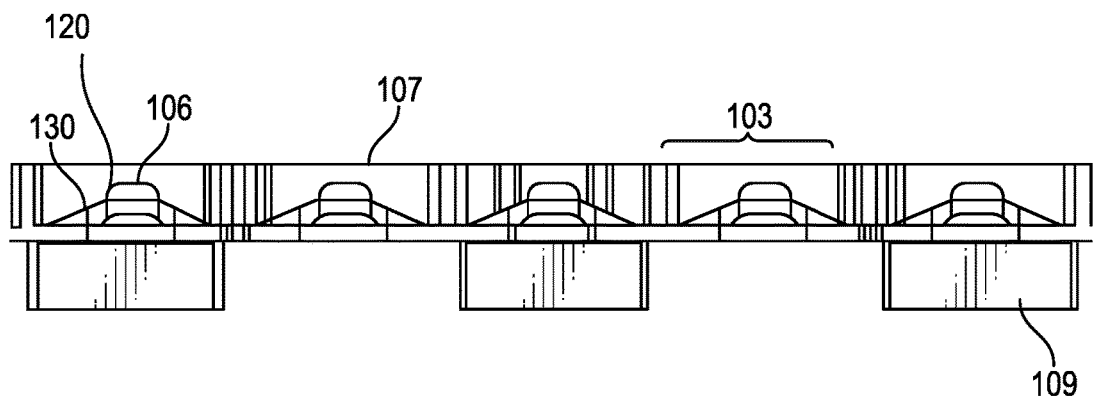
FIGS. 3A-3C illustrate various views of the media retention plate showing dual air and water slots according to an embodiment.
Figure 3B:
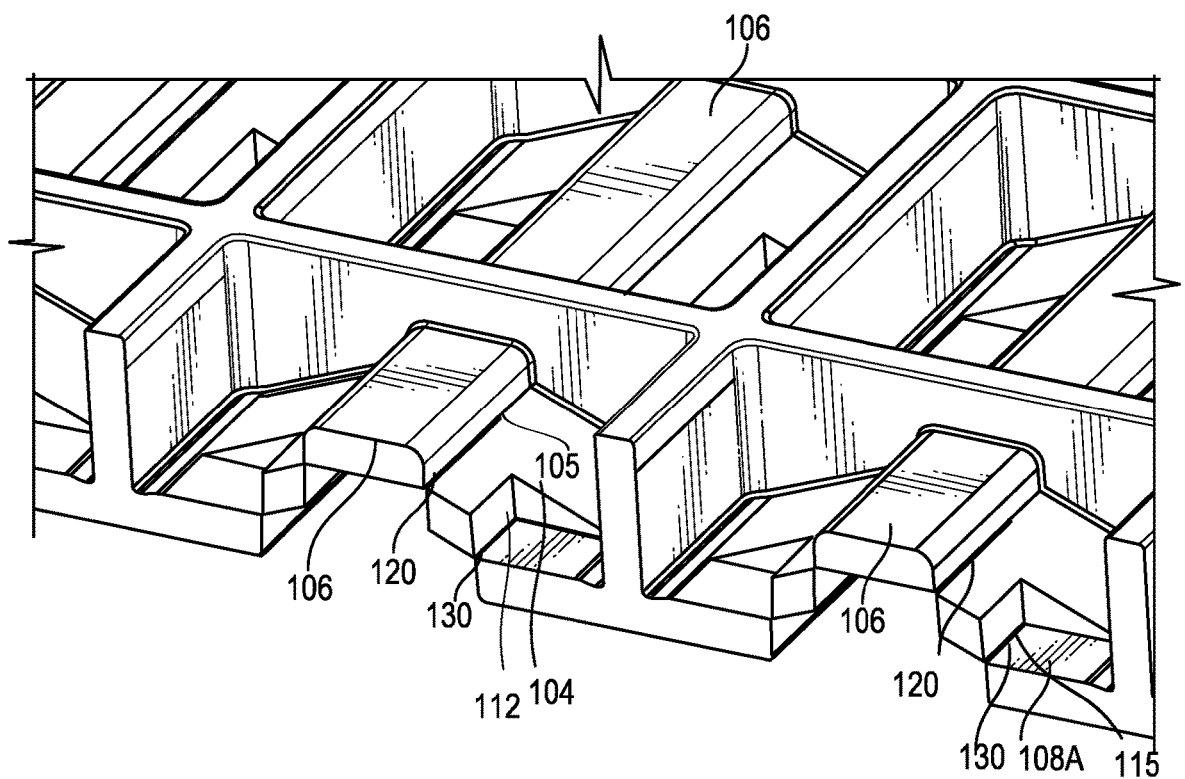
Figure 3C:
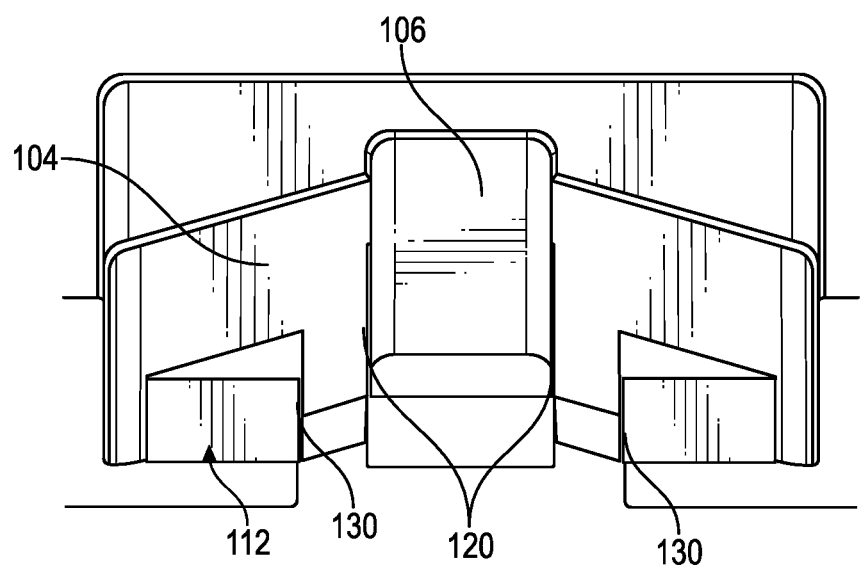

Now referring to FIGS. 3A-3C, each plate compartment/section 103 includes a central protrusion 106 flanked by a pair of downward sloping/angled surfaces 104 on either side of the protrusion. A portion of each sloped surface 104 may include a cutout portion 112.

Each of the plate sections 103 is configured with slots for two different fluid types, that is, a slot for air and another slot for water. It is understood that one or more slots can be formed in each plate section for each of these fluid types. For instance, an air slot 120 can be formed along an intersection 105 of a lower edge of the protrusion 106 (wherein the protrusion 106 has a top and lower edge) and a first (or an upper) end of one or both downward sloping surfaces 104. The air slot 120 has a predetermined length and extends along the entire or partial width of the intersection 105. A water slot 130 is formed along an intersection 115 of a second (or a lower) end of either or both downward sloping surfaces 104 and a top portion 108A of the bottom surface of the media retention plate. The water slot 130 has a predetermined length and extends along the entire or partial width of intersection 106. The width of the air and water slots 120, 130 is precisely engineered such that it does not allow passage of the filter media.

While U.S. Pat. Pub. No. 20180333660 also discloses both water and air slots, the water slot of the present invention does not extend through the sloped wall(s), and the air slot of the present invention does not extend through a top sidewall. Instead, the arrangement of the air and water slots in the present invention facilitates maintenance of optimal pressure inside the underdrain block, thereby ensuring the effectiveness of the underdrain block and the back pressure created by the media retention plate 100 on the underdrain system is also reduced. To ensure the filter is working under optimal conditions during the air, air-water and water only backwash the slots 120, 130 on the sloped surfaces 104 are utilized in two different ways. The air slots 120 are utilized during air scouring. Also, water level is maintained inside the filter block by returning the water back into the underdrain block utilizing the water slots 130. The water slots 130 ensure that optimal fluid flow is maintained during operation of the underdrain system.

During the backwash process, the fluid slots (120, 130) act as entry and exit points for the corresponding fluid (air, water) in an upward direction perpendicular to the top surface 107 and bottom surface 108 of the media retention plate.

The degree of slope (of the downward sloping surfaces 104) can be predetermined to improve/reduce the back pressure created due to the media retention plate 100 on the filter media using the pressure and volume relationship with the distance between the fluid slots 120, 130 on these surfaces 104. An optimal pressure can also be maintained inside the filter block to ensure the effectiveness of the filter block and the back pressure created by the media retention plate 100 on the underdrain system is reduced.

The slots 120, 130 are configured with a predetermined consistent slot size to allow for an even flow distribution out of the filter during the backwash process and optimizes flow into the filter block during the operation flow. In an exemplary embodiment, each slot can have a width of 0.008 inches or 0.2 millimeters (without limitation). In one or more embodiments, the slots extend through the depth of the plate to the bottom surface 108 of the plate 100. Additionally, the location/position of the air and water slots (120, 130) allows optimal flow in and out of the media retention plate 100. Each fluid flows into its respective slot (120, 130) due to the difference in their fluid density. The angled surfaces 104 further stabilize the velocity flow profile. The back pressure created by the original media retention plate is reduced by the angled surface 104 of the plate sections 103 by increasing the volume between the fluid slots and the top surface 107, while maintaining optimal pressure inside the underdrain block.

Furthermore, the slots 120, 130 on the sloped surfaces 104 aid in the backwash process. Air, water, and a combination of the two fluids are allowed to pass through the filter plate in a reverse direction to the process flow during backwash. The air slots 120 allow air to pass through the media retention plate 100 into the filter media, which agitates the media on top of the filter plate 100 using the collapse pulse that is created. The collapse pulse can clean the media due to turbulence and agitation of the media on the surface 107 of the media retention plate 100. This process also allows proper expansion of the bed and separation of the media due to the gravity of individual media being agitated. Furthermore, during an air only backwash, the water slots 130 allow the water to remain in the filter, which maintains the air to water distribution ratio inside the filter block. The water slots 130 also play an essential role during the process flow by maintaining proper fluid flow.

Figure 4:
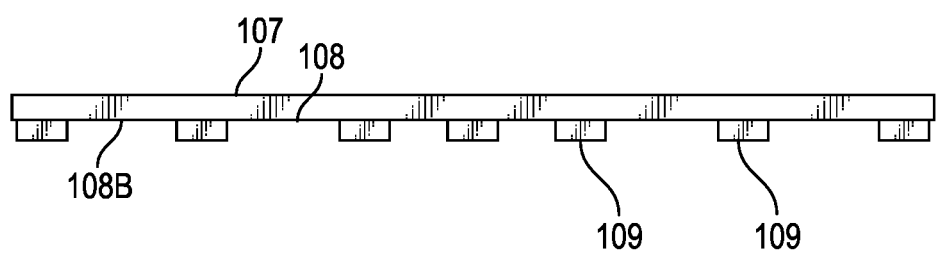
FIG. 4 illustrates a side view of the media retention plate having inserts according to an embodiment.

FIG. 4 illustrates a side view of the media retention plate 100 having a top surface 107 configured for placement of the filter media, and a bottom surface 108. Conventionally, during the air-water backwash process, the media retention plate experiences pressure on the bottom surface of the plate. This can push the filter away from the filter block creating a point for leakage and can cause an overall reduction in system performance and efficiency. Advantageously, the present media retention plate 100 is configured with a plurality of inserts or legs 109 attached to the base 108B of the bottom surface 108 the media retention plate 100. The inserts 109 can be secured to the underdrain block using affixation means (not shown), such as, without limitation, sealants, adhesives along with the screws, to improve the overall structural integrity of the media retention plate 100 and prevent uplift of the media retention plate. This can also improve the back pressure handling capabilities of the media retention plate 100.

In another embodiment, a method of manufacturing the media retention plate 100 involves using custom molds to create the two types of fluid slots 120, 130 described herein. The air and water slots 120, 130 can be precisely machined on the sloped surfaces 104 of the media retention plate 100 to maintain the required fluid flow features by utilizing a pair of relatively larger blocks (not shown) made of metal or other suitable material. Conventionally, a piece of metal, the size of a desired slot, is used in the mold to create the slot. Advantageously, the manufacturing of the present media retention plate avoids the use of such metal pieces in the mold. During the creation of the air and water slots in the present media retention plate, a relatively large mold block/piece which is the size of the cutout portion (112) is used in the mold. The corner or edge of this mold block is utilized to create an opening of a desired/predetermined size by allowing it to pass precisely through the surface of the media retention plate 100. In an exemplary embodiment, a first mold block can be pressed downward onto the sloped surface 104 to create the water slot 130. A second mold block piece can be pressed upward towards protrusion 106 to create the air slot 120. This makes the molding/manufacturing process easier and increases the life of the mold. As the slot openings are created utilizing a larger piece of metal which is of the size of the cutout portion, and not the size of the slots, it prevents the mold from wearing out, breaking or bending in multiple runs. This improves the life span of the mold and the efficiency. It also allows the creation of precise slot sizes—as small as, say, 0.0008"—which would not be complex or challenging using conventional manufacturing techniques.

Therefore, the present invention is well adapted to attain the ends and advantages mentioned as well as those that are inherent therein. The previous description is not intended to limit the invention, which may be used according to different aspects or embodiments without departing from the scope thereof. The discussion of acts, materials, devices, articles and the like is included in this specification solely for the purpose of providing a context for the present invention. It is not suggested or represented that any or all of these matters formed part of the prior art base or were common general knowledge in the field relevant to the present invention.

Furthermore, the particular illustrative embodiments disclosed above may be altered or modified and all such variations are considered within the scope and spirit of the present invention. While the media retention filter of the present invention and methods of its use are described in terms of "comprising," "containing," or "including" various devices/components or steps, it is understood that the systems and methods also can "consist essentially of" or "consist of" the various components and steps. Whenever a numerical range with a lower limit and an upper limit is disclosed, any number and any included range falling within the range is specifically disclosed. In particular, every range of values (of the form, "from about a to about b," or, equivalently, "from approximately a to b") disclosed herein is to be understood to set forth every number and range encompassed within the broader range of values. If there is any conflict in the usages of a word or term in this specification and one or more patent(s) or other documents that may be incorporated herein by reference, the definitions that are consistent with this specification should be adopted.

The invention claimed is:

1. A media retention plate for an underdrain filter block, comprising:
   a top surface, and a bottom surface opposite the top surface;
   a pair of opposing sidewalls, and a pair of opposing end walls, the pair of opposing sidewalls and the pair of opposing end walls together connecting the top surface and the bottom surface;
   a plurality of plate sections formed on the top surface, wherein each plate section further comprises a central protrusion, the central protrusion flanked on either side by a pair of opposing downward sloping surfaces; and
   wherein an air slot is formed along a first intersection, the first intersection formed by intersecting a lower edge of the central protrusion and a first end of a downward sloping surface, and
   a plurality of legs, wherein each leg is attached to the bottom surface of the media retention plate and is configured for affixation to a top surface of the underdrain filter block.

2. The media retention plate according to claim 1, further comprising a first set of inner walls, wherein each inner wall in the first set of inner walls extends from a first end wall to a second end wall.

3. The media retention plate according to claim 2, further comprising a second set of inner walls, wherein each inner wall in the second set of inner walls extends from a first sidewall to a second sidewall.

4. The media retention plate according to claim 3, wherein each wall in the first set of inner walls intersects with a corresponding wall in the second set of inner walls to form the plurality of plate sections.

5. The media retention plate according to claim 1, wherein the air slot extends along the width of the first intersection.

6. The media retention plate according to claim 1, wherein a water slot is formed along a second intersection, the second intersection formed by intersecting a second end of a downward sloping surface and a top portion of the bottom surface.

7. The media retention plate according to claim 6, wherein the water slot extends along the width of the second intersection.

8. The media retention plate according to claim 1, wherein the width of the one or more air and water slots is pre-engineered to ensure retention of filter media positioned over the media retention plate.

9. The media retention plate according to claim 1, wherein the media retention plate is configured to facilitate flow back of water into the underdrain block through the one or more water slots while maintaining air flow through the one or more air slots to create an optimal collapse pulse.

10. The media retention plate according to claim 1, wherein the one or more air and water slots are evenly sized and evenly spaced apart to facilitate the creation of a relatively smaller-sized collapse pulse during a sequential air-water backwash.

* * * * *